July 30, 1968   G. R. MILLARD   3,395,209

METHOD OF MOLDING ELECTRIC SWITCH PLATES IN MAT BODIES

Filed Sept. 30, 1965

INVENTOR.
George R. Millard
BY *Austin A. Webb*
ATTORNEY

United States Patent Office 3,395,209
Patented July 30, 1968

3,395,209
METHOD OF MOLDING ELECTRIC SWITCH PLATES IN MAT BODIES
George R. Millard, Tekonsha, Mich., assignor to Ronan & Kunzl, Inc., Marshall, Mich.
Filed Sept. 30, 1965, Ser. No. 491,604
9 Claims. (Cl. 264—272)

ABSTRACT OF THE DISCLOSURE

Two ferrous switch plates are secured in spaced relation by spaced separators positioned therebetween, the edges of the plates are spaced and sealed by a peripheral seal and the assembly is supported flatwise in spaced relation between the top and bottom of a mold by plastic chaplets, plural magnets applied to the exterior of the mold attract and hold the iron of the plate assembly flat and centrally of the mold cavity while plastic body material is injected into the mold and cured around the switch plate assembly.

---

The principal objects of this invention are:

First, to provide a method of manufacturing an electric switch mat of the type consisting of a flat body of flexible elastic material having a switch assembly consisting of two electrically conductive plates held apart at spaced intervals by internal spacers and sealed at their edges and entirely embedded within the flexible body of the mat without any holes or plugs extending between the bottom surface of the switch assembly and the surface of the mat.

Second, to provide a method of manufacturing electric switch mats in which a switch plate assembly consisting of spaced electrically conducting plates held apart at spaced intervals by insulating spacers and sealed at their edges is supported within a mold for the body of the mat in spaced relation from the bottom of the mold and which is incorporated and molded into the body of the mat by material which is poured into the mold around and over the plate assembly, the switch plate assembly being held down in generally flat position against supports in the bottom of the mold by magnetic attraction applied through the bottom of the mold to hold the plate assembly during the molding and curing operations.

Third, to provide, as a possible variation of the process, initial supports for the assembly in mold which are incorporated and assimulated into the material forming the electrically insulating body of the mat by and during the molding and curing operation.

Other objects and advantages of the invention will be apparent from a consideration of the following description and claims. The drawings of which there is one sheet illustrate a highly practical form of the mat and the steps of a preferred form of the method of manufacture thereof and one modified form of the method of manufacture.

Figure 1:
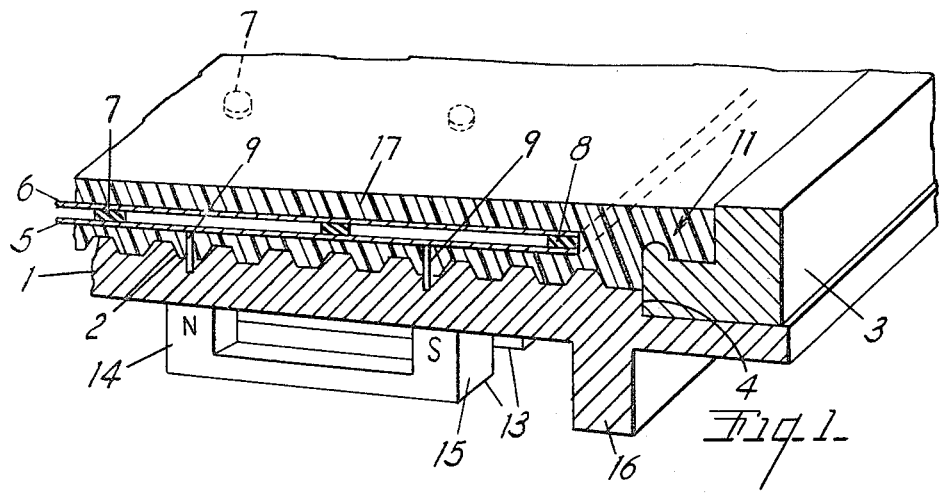
FIG. 1 is a fragmentary vertical cross sectional view partially in perspective of a mold and a switch mat molded therein according to a preferred form of the method of the invention.

Electric switch mats are old and well known and are used for a variety of purposes. A common form of switch mat consists of a body of flexible resilient material having a switch plate assembly molded therein and including a pair of electrically conductive plates held in spaced insulated relationship by a plurality of spacer plugs of discs and provided with separate wiring connections which project from the mat for connection to any part to be controlled by the switch mat. The pressure of a person stepping upon the switch mat forces the spaced plates into electrical contact to complete a circuit and perform a variety of functions. Switch mats of this type are commonly used to open doors when persons approaching the door step on the mat to actuate the door opening mechanism. As such the mats are commonly exposed to extremes of temperature and to moisture and the corrosive action of salt used to melt snow and ice around the mat and the doorway. It is accordingly necessary that the switch plate assembly be effectively sealed against the entrance of moisture to prevent deterioration of the switch and effectiveness of the mat and switch combination. In the past these switch plate mats have been assembled in molds in which a plurality of small pins disposed in spaced relationship over the area of the plate assembly in the mold hold the plate assembly in spaced relationship from the bottom of the mold so that a moldable flexible material can be poured into the mold and around the top and bottom of the plate assembly. Since the plate assemblies are commonly made of sheet steel which is not exactly flat, it has been general practice to provide other pins projecting downwardly from a cover or weighted hold down member to project into the mold cavity and hold the plates in generally flat central position within the mold while the material of the body of the mat is poured into the mold and cured. After the cured mat is solidified the hold down member and upper pins are removed and the mat is removed from the mold. The hold-down pins and the supporting pins in the mold thus leave a plurality of small pin holes in both surfaces of the body of the mat which extend to the surface of the switch plate assembly. These pin holes must be closed by plugs or other sealing operations, at least on the bottom of the mat, and not only add to the cost of the manufacturing operation but provide areas of possible leakage of moisture into the plate assembly. The holes are very small and damage to the switch mechanism is caused more by moisture seeping up from the damp area under the mat than by water, as liquid, running into the top holes. Water on top of the mat generally drains off and normal evaporation on the exposed top surface dries both the surface and any moisture that may have seeped into the upper ends of the holes in the top. The holes in the bottom, not being subject to this free evaporation, have been found to be bad sources or points of leakage into the switch assembly.

The present invention consists of a switch mat of the type described in which the flexible body of the mat has an entirely integrally solidified bottom completely surrounding the bottom of the plate assembly without pin holes or plugged or sealed pin holes. The mat is manufactured as is shown in FIG. 1 by providing a bottom mold member 1 having corrugations or projections 2 of suitable shape in its bottom to provide the desired surface contour to the mat being formed. A rim member 3 fits around a shoulder 4 on the top of the mold base member and defines the thickness of the mat and the contour of the periphery of the mat. The switch plate assembly of the mat consists of an upper plate 5 and a lower plate 6 which are desirably made of sheet steel and which are held in spaced electrically insulated relationship by plugs or discs 7 disposed in spaced relationship over the area of the two plates. The peripheries of the plates 5 and 6 are spaced apart and sealed against entry of the mat material by border strips 8. The strips 8 do not necessarily project between the plates and act as spacers. The plugs 7 and strip 8 are conveniently made of rubber adhered to the opposed surfaces of the plates.

The method of the invention contemplates the positioning of the switch plate assembly on the usual support pins 9 projecting from the bottom of the mold. As appears more clearly in FIG. 2, an electrical conductor 10 is connected to the switch plate and extends exteriorly through an edge or other portion of the finished mat. It will be understood that a similar conductor 10 is electrically connected to the opposite plate of the switch plate assembly, as is common practice.

The plates 5 and 6 are electrically conductive as previously noted and must further be magnetically attractive. Sheet steel is a common form of material for the plates. It is difficult to obtain sheet steel which is entirely flat or to maintain the plates 5 and 6 in flat condition during handling and as a result the plate assembly consisting of the two plates 5 and 6 may and frequently does contain ripples or bulges which would bring the bulged portions of the assembly closer to the bottom or top surface of the body 11. In order to hold the switch plate in generally central position of the body 11 during the molding of the mat body, a plurality of magnets 13 having north poles 14 and south poles 15 are secured to the bottom of the main mold member 1 in spaced relation over the area of the switch plate assembly. The mold 1 may be of metal that is magnetically conductive but since this dissipates the magnetic field of the magnets, suitable clamps (not shown) may hold the magnets to the bottom of the mold. Spaced legs or rails 16 on the bottom of the mold support the mold on a supporting surface (not illustrated) with room for the magnets 13 between the bottom surface of the mold 1 and the supporting surface. The magnetic field created by the magnets 13 attracts the steel plates 5 and 6 and holds them down against pins 9 but in spaced relation to the bottom of the mold. The strength of the magnetic field as determined by the number of magnets or their magnetic strength must not be strong enough to overly deflect the plates 5 and 6 downwardly beyond their normal elastic position as the inherent flexibility of the plates would tend to move the plates away from thir central position after the mat has been molded and this would tend to create a bulge or wrinkle in the mat itself and possibly separate the surface of one of the plates 5 or 6 from the adjacent body forming material which normally adheres naturally to the surfaces of the plates.

The body 11 of the mat is formed of a flowable but solidifiable material and a polyvinyl chloride is a common form of material for the body 11. This is poured in liquid form into the mold and flows under the switch plate assembly and around the pins 9 as well as over the top of the switch assembly to form the bottom portion 17 of the mat body. Other compatible materials that are available in fluid form and settable by various means to flexible elastic bodies are capable of use in the mat and the manufacture method of the invention. After the body 11 is poured into the mold the body material is cured and solidified as by being placed in an oven at the proper temperature in a well known manner. The finished mat is removed from the mold after the body 11 has been cured and solidified and it will be apparent that there are no holes or openings through the bottom surface of the mat to the switch plate assembly to be sealed or plugged or to open under conditions of use and permit the entrance of moisture into the mat. The small holes formed by the pins 9 in the top of the mat cause little trouble, and can be plugged or sealed as before.

Figure 3:
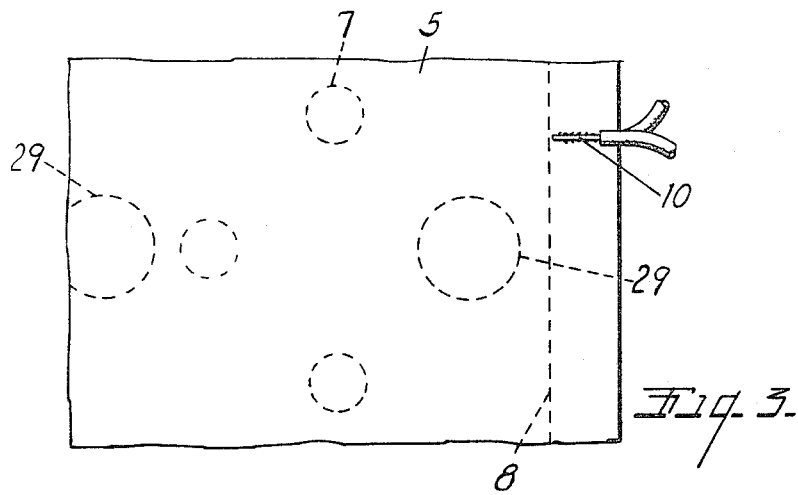
FIG. 3 is a fragmentary top plan view of the switch plate assembly shown in FIG. 2.
Figure 2:
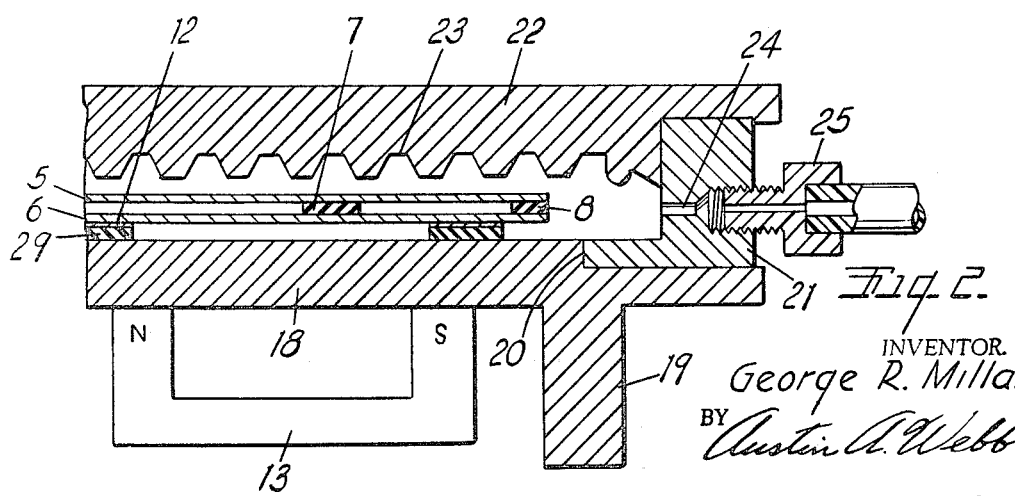
FIG. 2 is a fragmentary vertical cross sectional view through a modified form of mold with a switch plate assembly mounted therein and ready to be molded by another practical form of the method of the invention.

FIGURES 2 and 3 illustrate a highly practical modified form of the method of manufacture of the mat and in this case the bottom or main mold portion 18 consists of a at plate desirably of iron or magnetically conductive material and provided with the support rails 19 and having a peripheral shoulder 20 which receives the border member 21. The mold shown in FIG. 3 includes a cover member 22 which is corrugated or otherwise configured on its underside as at 23 to form the desired contour of the top of the mat. The rim member 21 is provided with an inlet port 24 and a fitting 25 through which the fluid material for forming the body of the mat may be introduced. Thus the modified form of mold in FIG. 3 is an injection mold as compared with the open mold in FIG. 1.

The switch assembly shown in FIG. 3 has the same plates 5 and 6 but it will be noted that the plates are inverted and that plural discs or chaplets 29 are secured by adhesive 12 to the bottom plates 6 as the mat is molded in upright position in this mold. As in the first form of the method the base 18 of the mold is provided with a plurality of magnets 13 or other means for creating a magnetic field which will attract the steel plates 5 and 6 and hold the chaplets against the bottom of the mold while holding the switch plate assembly generally centrally of the mold cavity.

Desirably the chaplets 29 consist of flexible material which is the same as or compatible with and capable of being bonded integrally with the body of the mat indicated generally by the numeral 11. In actual practice it is preferred to form the chaplets 29 of a partially or completely cured synthetic plastic material such as polyvinyl chloride which is heat settable. The fluid polyvinyl chloride bonds integrally and joins with the material of the chaplets 29 particularly if the chaplets themselves are formed of a partially cured and partially solidified polyvinyl chloride.

It will be apparent that other means for forming or creating the magnetic field besides the permanent magnets 13 illustrated may be employed. Further it is not necessary that the chaplets 29 be secured to the plate assembly as it is possible to simply place them in the bottom of the mold prior to laying the switch plate assembly thereon. The result is a mat that is continuous, integral, and unperforated in character, and through which moisture cannot penetrate.

The chaplets 29 may be used in the form of the process shown in FIG. 1, in place of the pins 9, if desired. This produces a unitary integral mat body as in FIG. 2, but as noted above, pin holes in the top of the mat are not as serious as in the bottom.

What is claimed as new is:

1. The method of manufacturing switch mats having a switch assembly including spaced electrically conductive and magnetically attractive generally flat plates sealed at their edges, which method comprises the steps of, placing said assembly in a shallow mold of greater depth than the thickness of said assembly, providing spacing means between a horizontal surface of said mold and said assembly, magnetically attracting said assembly and any nonplanar deflected portions of said generally flat plates toward said horizontal surface and said spacing means to more truly flatten said plates by a magnetic field acting through said horizontal surface, depositing a mass of fluid that is curable to a flexible body in said mold in sufficient quantity to completely surround said assembly and said spacing means, curing said mass in said mold, and removing the cured flexible mat body from the mold.

2. The method as defined in claim 1 in which the horizontal surface to which said assembly is attracted is configured to form the top surface of the mat formed therein.

3. The method as defined in claim 2 in which said surface is the bottom of the mold, and said spacing means are plural metallic pins projecting from the bottom of the mold and which remain in the mold when the mat is removed.

4. The method as defined in claim 2 in which said spacing means are plural chaplets of solidified fluid material that is integrally joinable with said fluid during said curing.

5. The method as defined in claim 4 in which said surface is the bottom of said mold.

6. The method as defined in claim 2 in which said spacing means are a plurality of pins projecting in spaced relation from said surface and which remain attached to said mold when said mat is removed.

7. The method as defined in claim 4 in which said fluid is a synthetic plastic,
and said chaplets are of the same synthetic plastic in partially cured form when placed in said mold.

8. The method as defined in claim 1 in which said fluid is a polyvinyl chloride and said spacing means are pieces of partially cured polyvinyl chloride.

9. The method as defined in claim 1 in which said horizontal surface to which said assembly is attracted is the bottom of said mold.

References Cited

UNITED STATES PATENTS

| | | |
|---|---|---|
| 2,110,091 | 3/1938 | Morse _____ 264—278 X |
| 2,465,276 | 3/1949 | Ryder. |
| 3,136,833 | 6/1964 | Wikkerink _____ 264—277 |
| 3,248,758 | 5/1966 | Schmitz et al. |

FOREIGN PATENTS

38–1,224   2/1963   Japan.

OTHER REFERENCES

Abstract of patent application 697,592, object holding and positioning means, O. G. (Apr. 3, 1951), vol. 645, p. 328.

ROBERT F. WHITE, *Primary Examiner.*

J. H. SILBAUGH, *Assistant Examiner.*